(12) United States Patent
Wolleschensky et al.

(10) Patent No.: US 8,098,374 B2
(45) Date of Patent: Jan. 17, 2012

(54) HIGHLY SENSITIVE SPECTROSCOPIC UNIT

(75) Inventors: Ralf Wolleschensky, Jena (DE);
Hans-Juergen Dobschal, Kleinromstedt (DE); Reinhard Steiner, Stadtroda (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 422 days.

(21) Appl. No.: 12/444,244

(22) PCT Filed: Oct. 2, 2007

(86) PCT No.: PCT/EP2007/008552
§ 371 (c)(1),
(2), (4) Date: Apr. 3, 2009

(87) PCT Pub. No.: WO2008/043457
PCT Pub. Date: Apr. 17, 2008

(65) Prior Publication Data
US 2010/0007878 A1   Jan. 14, 2010

(30) Foreign Application Priority Data
Oct. 6, 2006  (DE) .......................... 10 2006 047 913

(51) Int. Cl.
*G01J 3/28* (2006.01)

(52) U.S. Cl. ........................................ 356/334

(58) Field of Classification Search .................. 356/328, 356/334
See application file for complete search history.

(56) References Cited

U.S. PATENT DOCUMENTS

| | | | |
|---|---|---|---|
| 3,791,737 A * | 2/1974 | Johansson | 356/331 |
| 4,110,042 A * | 8/1978 | Leitz | 356/4.04 |
| 5,189,486 A | 2/1993 | Florek et al. | |
| 5,565,983 A | 10/1996 | Barnard | |
| 5,638,173 A * | 6/1997 | Smith et al. | 356/301 |
| 5,737,125 A | 4/1998 | Ohashi | |
| 7,009,699 B2 | 3/2006 | Wolleschensky et al. | |
| 7,193,707 B2 | 3/2007 | Ohnishi et al. | |
| 2001/0046087 A1 | 11/2001 | Hoose | |
| 2007/0019194 A1* | 1/2007 | Chen et al. | 356/328 |
| 2007/0030484 A1* | 2/2007 | Sobczynski | 356/328 |

FOREIGN PATENT DOCUMENTS

DE        197 01 753        7/1998
(Continued)

OTHER PUBLICATIONS

XP-002462668 "Optics" Eugene Hecht, 1987, Addison Wesley Reading Massachuetts, pp. 424-429.

*Primary Examiner* — Kara E Geisel
(74) *Attorney, Agent, or Firm* — Frommer Lawrence & Haug LLP (57) ABSTRACT

The invention is directed to a highly sensitive spectrum analysis unit with a diffraction grating, wherein a parallel light bundle having a wavelength range impinges on a diffraction grating which splits the different wavelengths into spectra by diffraction in first directions, and wavelength partial ranges of the spectrally split light bundle can be focused on a detector row by means of camera optics, and evaluation electronics are connected to the detector row and acquire the generated spectrum as information and display it. The invention is characterized in that the light bundle passes a first optical element, and then wavelength partial ranges of a spectrally split light bundle impinge on respective partial regions of a diffraction grating, the diffraction grating having the same grating constant across all partial regions and a changing profile shape, the profile shapes generating different blaze wavelengths that lie in the respective wavelength partial ranges.

7 Claims, 5 Drawing Sheets

FOREIGN PATENT DOCUMENTS

| | | |
|---|---|---|
| DE | 101 51 217 | 4/2003 |
| EP | 0 442 596 | 8/1991 |
| EP | 1 560 039 | 8/2005 |
| JP | 56-057010 | 5/1981 |
| JP | 06241897 A1 * | 9/1994 |
| WO | WO 2006/077106 | 7/2006 |

* cited by examiner

HIGHLY SENSITIVE SPECTROSCOPIC UNIT

The present application claims priority from PCT Patent Application No. PCT/EP2007/008552 filed on Oct. 2, 2007, which claims priority from German Patent Application No. DE 10 2006 047 913.0 filed on Oct. 6, 2006, the disclosure of which is incorporated herein by reference in its entirety.

BACKGROUND OF THE INVENTION

1. Field of the Invention

The invention is directed to a highly sensitive spectrum analysis unit which uses a diffraction grating, wherein a parallel light bundle having a wavelength range impinges on a diffraction grating which splits the different wavelengths in spectra by diffraction in first directions. The wavelength partial ranges of the spectrally split light bundle are focused onto a detector row through optics, and evaluating electronics connected to the detector row obtain the generated spectrum as information and display it.

The spectral unit can be applied in all spectrometers. The unit is used in particular in a confocal laser scanning microscope (LSM) such as is described in DE 197 02 753 A1 or DE 101 51 217 A1 as a measuring device for spectrally split detection of fluorescence.

2. Description of Related Art

There are a great many arrangements for spectral analysis of radiation which make use of a variety of dispersive means. Gratings and prisms are used most commonly. Simple solutions can also be realized with filters. Most applications use gratings with a surface profile whose topography is reproduced by replication methods permitting an economical production of unit quantities. Since generally only one diffraction order of the grating is used, the user has the possibility of obtaining much diffracted light in the useful order from sawtooth profile shapes. For optimal profile depth (approximately half of the wavelength of the diffraction maximum—blaze wavelength), between 70% and 90% diffraction efficiency is obtained in the reflected useful order depending on the spatial frequency of the grating. However, this diffraction efficiency decreases steadily when the blaze wavelength is abandoned for higher or lower wavelengths. This "missing light" in the spectrum of the useful order reaches other diffraction orders and escapes detection.

A known method for circumventing this problem is to use echelle systems as is described in EP 442 596 B1. A plane grating in very high diffraction orders is used for this purpose, wherein short, overlapping spectral regions of the different diffraction orders occur initially, all of which work in the vicinity of the blaze angle. A prism working perpendicular to the dispersion direction of the grating is added to the system for lateral separation of the spectra. Many order lines which are located one above the other laterally are obtained in this way. However, application of this method is conditional upon the use of a surface receiver. The reason for the spectral fluctuation in diffraction efficiency is that the electromagnetic behavior of the grating diffracts a more or less large proportion of the light in diffraction orders other than the desired, first diffraction order, and this light is accordingly lost and even causes scatter light problems.

There are some measurement methods in which the existing light in the spectrum (of one order) must be evaluated as completely as possible. One such method is the spectral evaluation of fluorescent light in microscopy with biological samples.

SUMMARY OF THE INVENTION

It is the object of the invention to significantly increase the diffraction efficiency of a spectrum analysis unit with a grating in an economical manner.

This object is met in a highly sensitive spectrum analysis unit with a diffraction grating of the type mentioned above having the characterizing features of claim 1. Subclaims 2 to 7 show advantageous developments of the main claim.

In the solution according to the invention, the light bundle to be spectrally analyzed is predispersed in spectra by a first element and is then split into the spectrum to be detected by another, second element which is optimally adapted to the predispersion. In this connection, it is important that the first element is selected in such a way that it has a very high transmission for the spectrum to be detected. However, the second element can also be a surface grating with a profile shape which remains constant, varies partially, or changes constantly over the surface. In order to obtain a high transmission of the first element influencing the spectrum, a prism or—in another construction—dichroic mirrors are used. The components can be antireflection-coated to reduce Fresnel losses.

In a first embodiment form, the predispersion is carried out by means of dichroic splitters. The splitters should have the greatest possible steepness at their transmission limits and reflection limits, and their spectral partial regions should flow seamlessly into one another. The solution by means of dichroic splitters can be cascaded, i.e., the quantity of spectral partial regions which is used depends on the aimed-for spectral yields and the cost of the arrangement. Splitting into three spectral partial regions using two dichroic splitters and two efficient mirrors is preferred.

The grating preferably comprises three grating regions, each of whose blaze wavelength is optimally adapted to the respective spectral partial region. The entire grating has a uniform spatial frequency, and the grating grooves of all of the partial regions are aligned exactly parallel to one another. The grating grooves lie in a plane and the dispersion plane extends perpendicularly from the plane. A high diffraction efficiency can be generated in the spectral partial regions in this way. The dispersed light is guided through camera optics (mirror system/lens system) to a detector with an evaluating unit.

Another embodiment form for realizing a high yield of spectrally detectable light is based on predispersion by means of prisms as first dispersive element, and a second dispersive element whose capability for spectral dispersion is optimally adapted to the spectral course of the predispersed spectrum. This second dispersive element is a diffraction grating (the dispersion direction is perpendicular to the dispersion of the prism) which diffracts the constantly changing wavelength of the predispersed spectrum in a highly efficient manner by means of its variable profile shape (blaze wavelength adaptation). Accordingly, a diffraction efficiency near the blaze wavelength can be realized for all wavelengths of the spectrum to be detected and, therefore, a very high proportion can be transferred into the detection spectrum. A variable diffraction capability of this kind can be realized in gratings, e.g., with variable blaze angles or with a uniform grating profile combined with variable layers in the dispersion direction. Variable profile depths (corresponding to variable blaze wavelengths) of a uniform spatial frequency of the grating can be realized by means of a variable exposure dose in lithographic methods or by ion etching techniques.

The construction of the diffraction grating and its characteristics can be carried out in different ways for the embodiment forms of the invention described herein. For example, the grating can comprise a different quantity of partial regions which corresponds to the quantity of the spectral regions formed by the predispersion. Accordingly, the grating can comprise, e.g., two or more than three grating regions, each of which is optimally adapted to the partial spectrum of the predispersion.

However, a grating whose diffraction characteristics are adapted to the spectral course of the predispersion by a constantly varying blaze wavelength in the dispersion direction of the grating can also be used.

In another variant, a grating with constant blaze wavelength is used and a continual blaze shift in the dispersion direction is obtained by means of a layer construction which changes in the dispersion direction.

In another variant, transmission gratings with partial regions which are spectrally adapted to the predispersion are also used. Of course, the camera optics can be designed as reflection optics as well as transmission optics.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
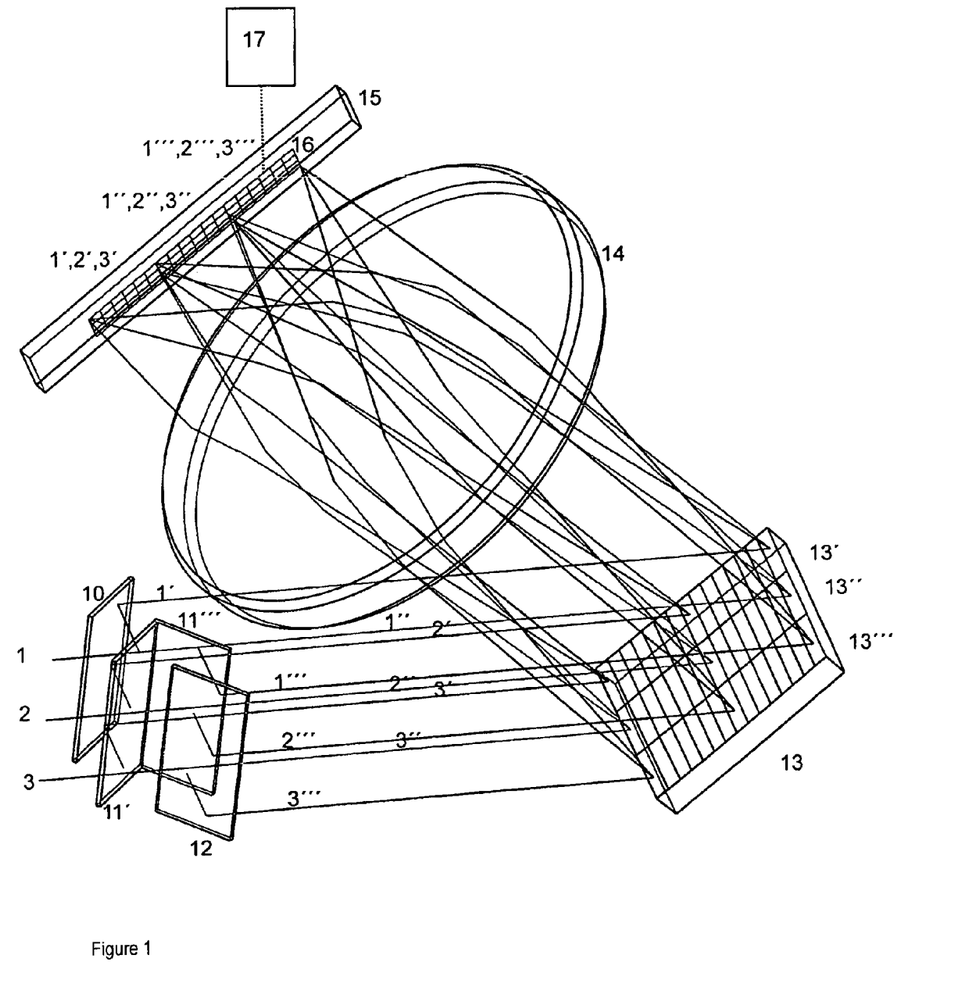
FIG. 1 shows a highly sensitive spectrum analysis unit with dichroic beamsplitters.

FIG. 1 shows a first embodiment form of the invention in which dichroic splitters 11' and 11''' with highly reflective mirrors 10 and 12 are used for the spectral predispersion. Further, viewed in the light propagation direction, a diffraction grating 13, imaging optics 14, and a detector row 15 are arranged. The detector row 15 has individual elements 16 arranged in lateral direction. The individual elements have a width b. The elements 16 of the detector row 15 are connected to evaluating electronics 17. The diffraction grating 13 operates by reflection and comprises three partial regions 13', 13'' and 13''' which have different blaze wavelengths. The dispersion direction of the diffraction grating is oriented perpendicular to the spectral predispersion carried out by the dichroic splitters 11' and 11''' and the highly reflective mirrors 10 and 12.

The parallel light bundle which impinges on the arrangement and is characterized with respect to its meridional extension by an upper meridional rim ray 1, a principal ray 2 and a lower meridional rim ray 3 has a spectral bandwidth of 360 nm to 810 nm. These rays preferably strike the first dichroic splitter 11' at an angle of 45°. The splitter 11' is constructed as a longpass filter with a transition edge of about 510 nm. This means that the light of less than 510 nm is reflected by the first dichroic beamsplitter 11a, while the spectrum above this edge transmits very efficiently (greater than 90%) and impinges on the second dichroic splitter 11''' at an angle of 45°. While the spectral proportion that is reflected by the dichroic splitter 11' is deflected onto the highly reflective first mirror 10 in direction of the diffraction grating with grating region 13', the proportion transmitted by the first dichroic beamsplitter 11' reaches the second dichroic beamsplitter 11''' which is a shortpass filter with an edge at approximately 660 nm. The spectral proportion above 660 nm is efficiently reflected (greater than 90%) by the second dichroic beamsplitter 11''' in direction of the highly reflective mirror 12, while the spectral proportions below 660 nm are transmitted to the splitter 11''' with low losses. The light transmitted by the splitter 11''' reaches the grating region 14'' of the grating 13 directly without further deflection. The light reflected by splitter 11''' reaches grating region 13''' by way of the second highly reflective mirror 12. In the construction according to the invention, the dichroic splitters 11a and 11b and the highly reflective mirrors 10 and 12 are arranged in such a way that the light bundles 1', 1'', 1''' and 2', 2'', 2''' and 3', 3'', 3''' formed by the spectral predispersion each travel in direction of the grating 13 in a plane and parallel to one another.

The grating 13 with its partial regions 13', 13'', 13''' is so oriented with respect to the light bundles 1', 1'', 1''' and 2', 2'', 2''' and 3', 3'', 3''' exiting the spectral predisperser that the dispersion plane of the grating is perpendicular to the plane split by the light bundles 1', 1'', 1''' and 2', 2'', 2''' and 3', 3'', 3'''.

The spectral proportions characterized by bundles 1', 1'' and 1''' and reflected by the mirror 10 impinge on the grating region 13' with a blaze of wavelength of 410 nm and are accordingly diffracted with a diffraction efficiency between 70% and 90%.

The proportions reflected by the mirror 12 which are characterized by bundles 3', 3'' and 3''' (long-wave spectral proportions) impinge on the grating region 13''' of the grating 13 with a blaze wavelength of 710 nm. The spectral proportions which are transmitted by the dichroic splitters 11' and 11''' impinge on the grating region 13'' with a blaze wavelength of 560 nm.

All spectral proportions which occur as a result of the predispersion and which reach the grating 13 as parallel bundles are spectrally dispersed by this grating 13 with high efficiency and pass through camera optics 14 in whose focal plane the detector row 15 with the individual detector elements 16 is located. The detector row 15 is oriented with respect to the diffraction grating 13 in such a way that the dispersion direction of the grating and the arrangement of the detector elements 16 extend parallel to the detector row 15.

Figure 2:
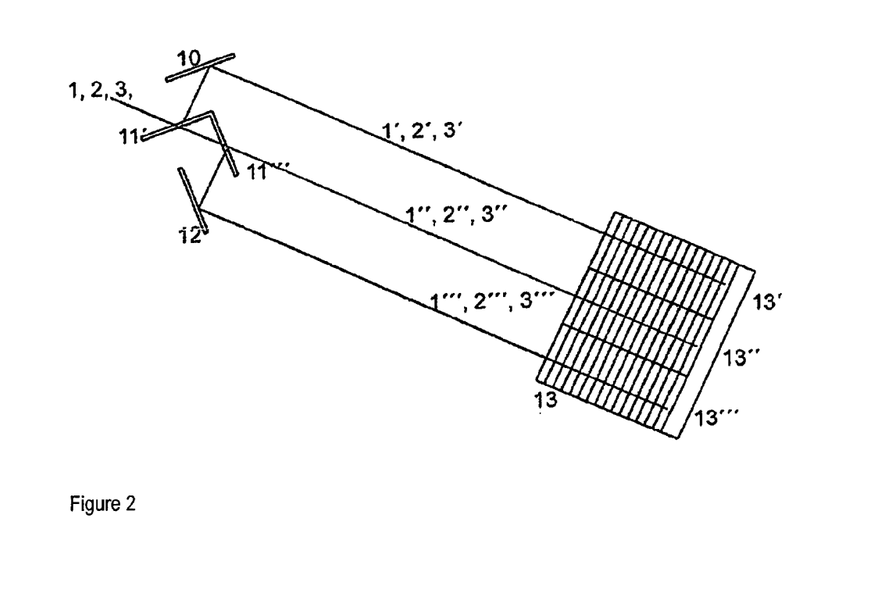
FIG. 2 is a sagittal view of a section of the arrangement according to FIG. 1.

FIG. 2 shows the sagittal view of the arrangement with predispersion by means of dichroic splitters. The entire spectrum is dispersed into three spectral regions, represented by 1', 2', 3' and 1", 2", 3" and 1''', 2''', 3''', through the arrangement of the two dichroic mirrors 11' and 11''' with the highly reflective mirrors 10 and 12 and is guided to grating regions 13', 13" and 13''' of the grating 13 which are optimized to these spectral partial regions. This arrangement makes it possible to guide the light to be spectrally analyzed to the detection system in a spectrally dispersed manner substantially without losses.

Figure 3:
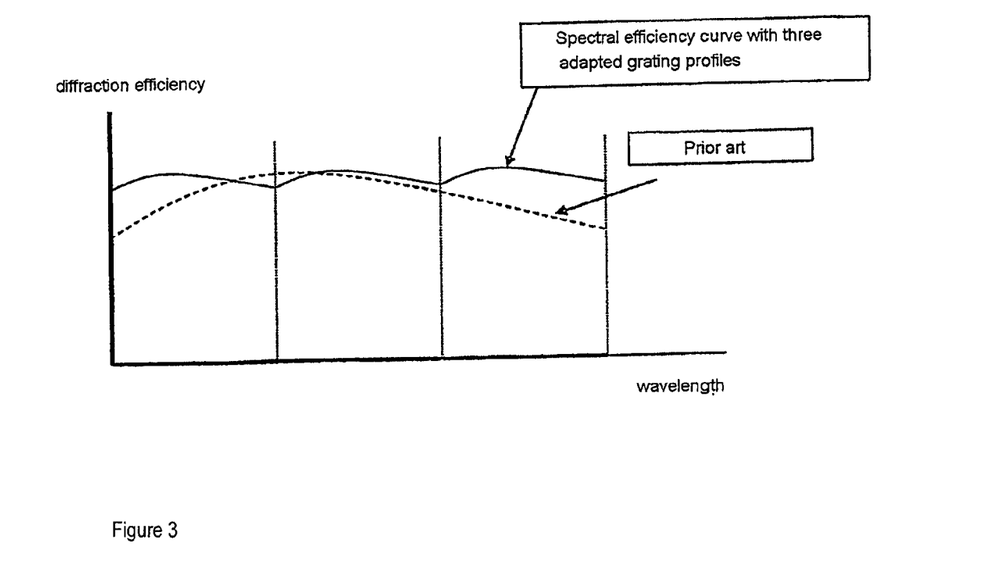
FIG. 3 shows a comparison of the spectrally realized light quantity of a solution according to FIG. 1 to the prior art solution which uses a grating of the same profile shape.

In FIG. 3, the efficiency of the arrangement described in FIG. 1 is compared to a blaze grating with a uniform profile shape according to the prior art. In particular, the losses in the spectral edge areas of the light to be analyzed can be compensated by means of this arrangement. The "yield of spectrally dispersed light" is shown by the solid curve in relation to the dashed curve.

Figure 4:
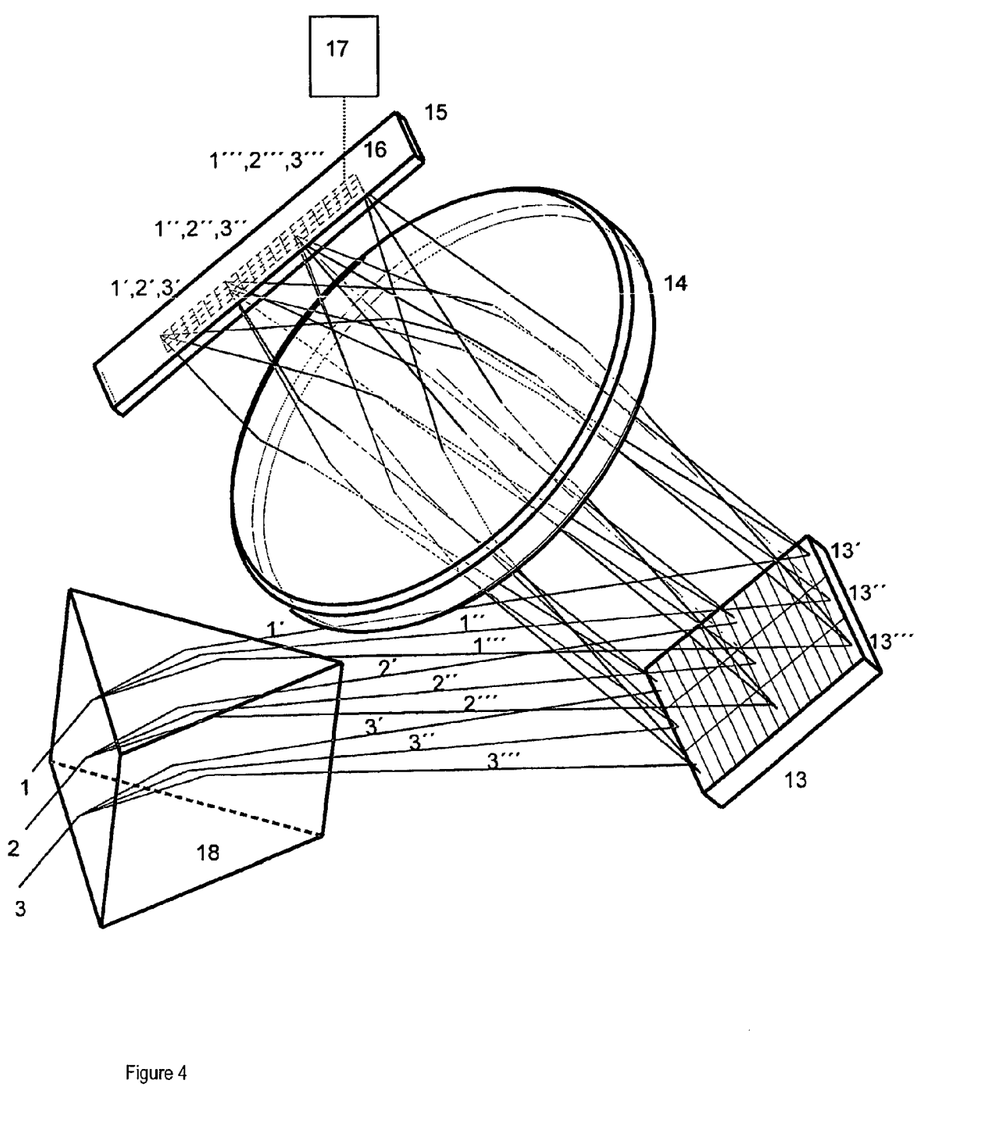
FIG. 4 shows a highly sensitive spectrum analysis unit with a dispersion prism.

FIG. 4 is a three-dimensional representation of a second embodiment form of the invention. The spectral predispersion is carried out with a prism 18. The prism 18 comprises optical glass NSK2 and has a prism angle $\epsilon=60°$ and a prism height of 30 mm.

The incident parallel beam bundle with the spectral bandwidth of, e.g., 360 nm to 800 nm is characterized by the principal ray 2, the upper meridional rim ray 1 and the lower meridional rim ray 3. For the sake of clarity, the sagittal extension of the incident bundle is not shown in this drawing.

The spectral splitting of the lower meridional rim ray 3 through the prism is characterized by rays 3', 3", 3''', the spectral splitting of the principal ray 2 is characterized by 2', 2", 2''' and, correspondingly, the spectral splitting through the prism for the upper meridional rim ray is represented by 1', 1", 1'''. The numbers with the single prime mark represent the long-wave spectral proportion, the numbers with two prime marks represent the middle spectral proportion, and the numbers with three prime marks stand for the short-wave spectral proportion of the total incident spectrum.

According to the arrangement in FIG. 4, the individual proportions which are predispersed by the prism impinge upon different partial regions of the second dispersive element of the arrangement, the diffraction grating 13 which is formed as a reflection diffraction grating in this embodiment (for example, with a vacuum-deposited layer of aluminum), corresponding to their original different entrance height. In this embodiment form, the grating comprises three regions 13', 13" and 13''' of different blaze wavelengths of the sawtooth-shaped groove profile, each of which is optimally adapted to the spectral partial bundle striking this partial region.

The arrangement according to the invention has the specific feature that the dispersion plane of the grating is rotated by 90° relative to that of the prism. The blaze wavelength of partial region 13''' is 410 nm, the blaze wavelength of partial region 13" is 560 nm, and the blaze wavelength of grating region 13' is 710 nm.

The proportions of the total spectrum 1''', 2''' and 3''' which are refracted most strongly by the prism reach the partial region of grating 13''' and contain the spectral region from 360 nm to 510 nm. The spectral partial regions 1", 2" and 3" contain the spectral region from 510 nm to 660 nm and arrive at partial region 13" of the grating. The long-wave spectral proportion of the total spectrum that is deflected the least through the prism with the spectrum from 660 nm to 810 nm is characterized by bundles 1', 2' and 3' and strikes grating portion 13'.

The arrangement according to the invention ensures that the spectral partial regions realized by the predispersion and characterized by bundle designations 1', 2', 3' and 1", 2", 3" and 1''', 2''', 3''' impinge on grating regions whose diffraction is optimally adapted and are spectrally split with a high diffraction efficiency between 70% and 90% (non-polarized light) perpendicular to the dispersion direction of the prism.

In a particularly advantageous manner, the diffraction grating 13 is formed with a continuously changing blaze angle (along 13' and 13"). The blaze angle is formed in such a way that the spectral components which are spectrally dispersed in the prism impinge on optimally adapted diffracting grating regions. This eliminates discontinuities in the diffraction efficiency (see FIG. 3), and a maximum diffraction efficiency results in the entire spectral region. This spectrum which is generated by the diffraction grating 13 with a grating constant of 1300 L/mm passes through camera optics 14 which, in the present example, comprise a lens whose focal length f=100 mm and whose focal plane is located in the detector row 15 with the individual detector elements 16. The detector row 15 is oriented in such a way that its elements are aligned in the direction of dispersion of the grating.

Figure 5:
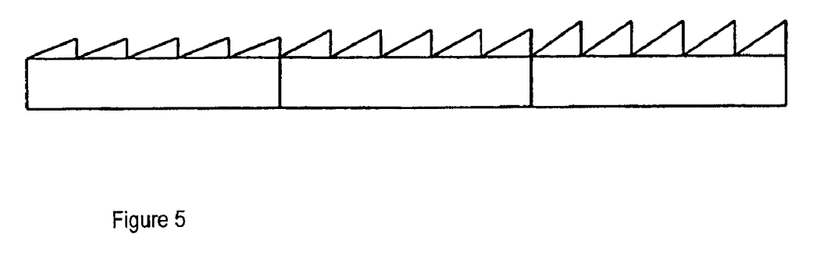
FIG. 5 shows a first embodiment form of the reflection grating.

FIG. 5 shows a first embodiment form of the reflection grating which has three discrete areas which have the same grating period, but whose grating profiles have a different height.

Figure 6:
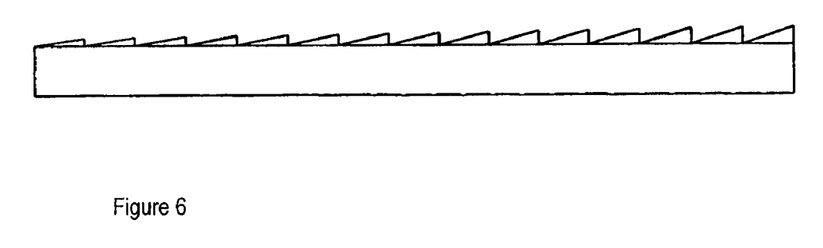
FIG. 6 shows a second embodiment form of the reflection grating.

FIG. 6 shows a second embodiment form of the reflection grating which has a constantly increasing height of the grating profiles which have the same grating period.

Figure 7:
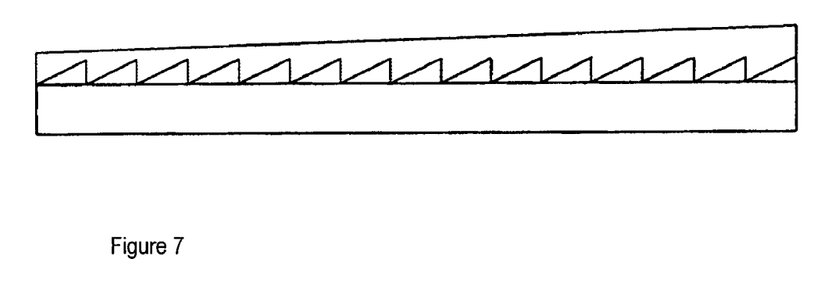
FIG. 7 shows a third embodiment form of the reflection grating.

FIG. 7 shows a third embodiment form of the reflection grating which has the same grating period, the same height of the grating profiles, but a cover layer whose thickness increases constantly.

Figure 8:
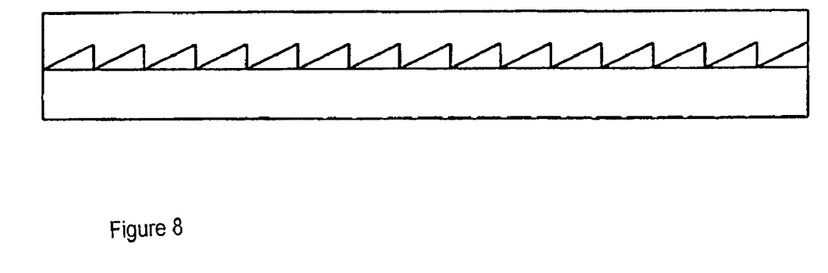
FIG. 8 shows a fourth embodiment form of the reflection grating.

FIG. 8 shows a fourth embodiment form of the reflection grating which has the same grating period, the same height of the grating profiles, the same thickness of the cover layer, but a refraction gradient in the cover layer.

Figure 9:
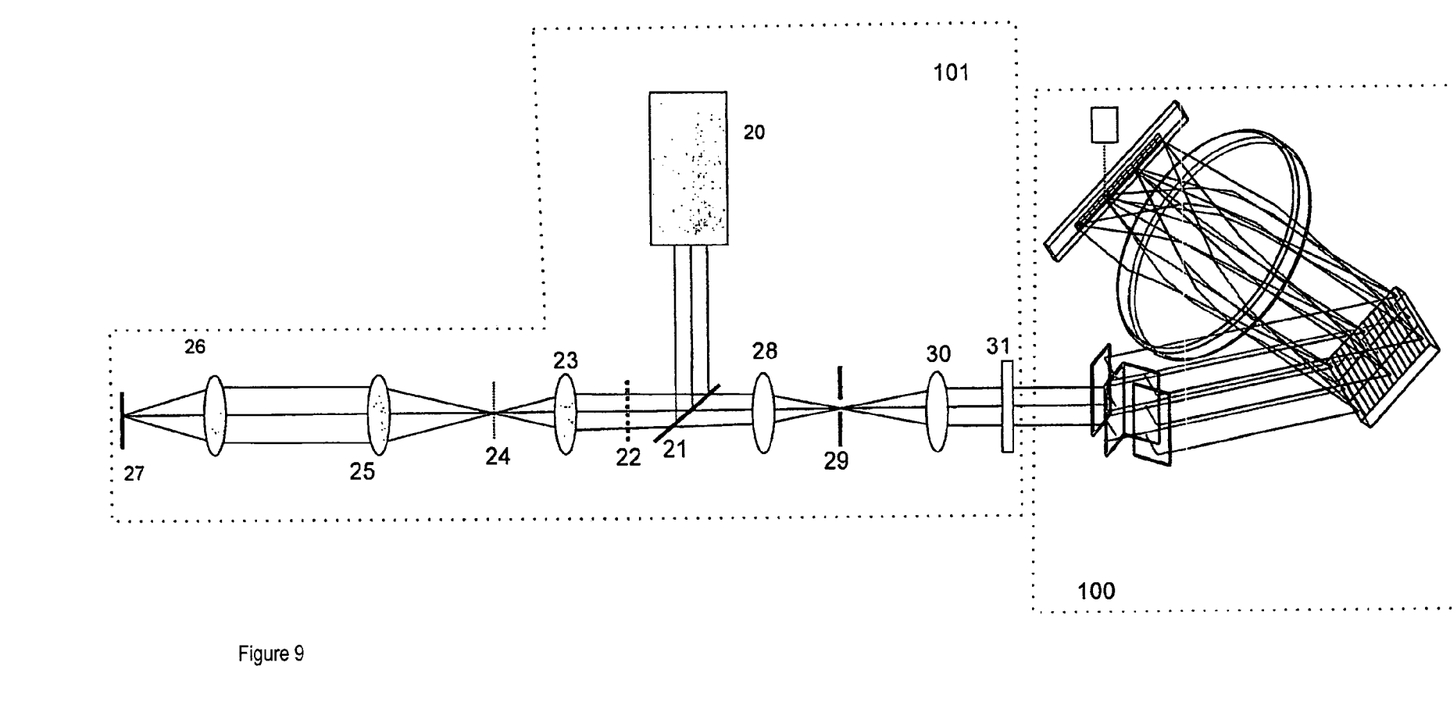
FIG. 9 schematically shows the construction of a confocal laser scanning microscope with the highly-sensitive spectrum analysis unit, according to an embodiment of the invention, as a measuring device.

FIG. 9 schematically shows the construction of a confocal laser scanning microscope 101 with the highly-sensitive spectrum analysis unit 100, according to the invention, as a measuring device. The construction of the spectrum analysis unit 100 corresponds to the arrangement shown in FIG. 1. The spectrum analysis unit 100 can also correspond to the arrangement shown in FIG. 4, although this is not shown.

The beam bundle exiting from the light source 20 reaches the sample 27 via a main color splitter 21, an x-y scanner 22, scan optics 23, a tube lens 25, and an objective 26. The light bundle exiting from the sample 27 reaches the beamsplitters of the spectrum analysis unit 100 via the objective 26, the tube lens 25, the scan optics 23, the x-y scanner 22, the main color splitter 21, pinhole optics 28, a pinhole 29, collimator optics 30 and an emission filter 31.

An intermediate image 24 is formed between the scan optics 23 and the tube lens 25. It is also particularly advantageous when the invention can also be installed in existing laser scanning microscopes and other spectrometric devices.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMBERS 1 upper meridional rim ray
2 principal ray
3 lower meridional rim ray
1', 2', 3' long-wave components of the rays 1, 2, 3

1", 2", 3" medium spectral components of the rays 1, 2, 3
1''', 2''', 3''' short-wave components of the rays 1, 2, 3
10 first mirror
11' first dichroic beamsplitter (long-wave)
11''' second dichroic beamsplitter (short-wave)
12 second mirror
13 diffraction grating with partial regions of different blaze wavelengths 13' (long-wave), 13" (medium wavelength region) and 13''' (short-wave)
14 camera optics
15 detector row
16 elements of the detector row
17 evaluating electronics
18 dispersion prisms light source
21 main color splitter
22 x-y scanner
23 scan optics
24 intermediate image tube lens
26 objective
27 sample
28 pinhole optics
29 pinhole
30 collimator optics
31 emission filter
100 spectrum analysis unit
101 confocal laser scanning microscope

The invention claimed is:

1. A highly sensitive spectrum analysis unit with a diffraction grating;
    wherein a parallel light bundle having a wavelength range impinges on the diffraction grating which splits the different wavelengths into spectra by diffraction in first directions;
    wherein wavelength partial ranges of the spectrally split light bundle can be focused on a detector row by means of camera optics; and
    wherein evaluation electronics are connected to the detector row and acquire the generated spectrum as information and display it;
    wherein the light bundle passes through a first optical element, and then wavelength partial ranges of a spectrally split light bundle impinge on respective partial regions of the diffraction grating;
    wherein the diffraction grating has the same grating constant across all partial regions and a changing profile shape; and
    wherein the profile shapes generate different blaze wavelengths that lie in the respective wavelength partial ranges.

2. The highly sensitive spectrum analysis unit with a diffraction grating according to claim 1;
    wherein the first optical element is a beamsplitter.

3. The highly sensitive spectrum analysis unit with a diffraction grating according to claim 1;
    wherein the first optical element is a dispersive element.

4. The highly sensitive spectrum analysis unit with a diffraction grating according to claim 3;
    wherein the dispersive element is a dispersion prism.

5. The highly sensitive spectrum analysis unit with a diffraction grating according to claim 1;
    wherein the diffraction grating has a number of partial regions corresponding to the number of wavelength ranges.

6. The highly sensitive spectrum analysis unit with a diffraction grating according to claim 1;
    wherein the diffraction grating has a constantly changing profile shape which is adapted to the wavelength range of the incident light bundle.

7. The highly sensitive spectrum analysis unit with a diffraction grating according to claim 1;
    wherein the analysis unit is used as a detector in a laser scanning microscope.

* * * * *